Nov. 10, 1925.

L. ROUANET 1,561,026

LOCKING DEVICE FOR REMOVABLE WHEELS

Filed April 11, 1922

INVENTOR:
Louis Rouanet
By Wm Wallace White
ATTY.

Patented Nov. 10, 1925.

1,561,026

UNITED STATES PATENT OFFICE.

LOUIS ROUANET, OF IVRY-PORT, FRANCE, ASSIGNOR TO THE COMPAGNIE D'APPLICATIONS MECANIQUES, OF PARIS, FRANCE.

LOCKING DEVICE FOR REMOVABLE WHEELS.

Application filed April 11, 1922. Serial No. 551,681.

*To all whom it may concern:*

Be it known that I, LOUIS ROUANET, citizen of the French Republic, residing at Ivry-Port, Seine, in the Republic of France, have invented new and useful Improvements in Locking Devices for Removable Wheels, of which the following is a specification.

The present invention relates to a locking device for removable wheels of the type in which an external removable hub is mounted like a sleeve upon a permanent internal hub, these two hubs being adapted to rotate as a whole. In this type of wheel, the external hub is fixed to the internal hub by means of a central nut.

One of the principal characteristics of the invention resides in that the central nut is locked in position by a spring actuated rod which is adapted to slide in a direction at right angles to the axis of the wheel in diametrically opposite holes provided in the central nut, said rod being provided with teeth which engage preferably at two diametrically opposite points with a set of teeth provided on the outer hub.

The locking is provided by means of a locking rod comprising two teeth entering two diametrically opposite recesses of the toothed outer end of the removable hub; under these conditions the efforts from the removable hub upon the locking rod are exerted in two opposite directions and said rod has no tendency to rotate about its own axis.

The invention will be better understood by referring to the accompanying drawing which is given by way of example and wherein.

Figure 1:
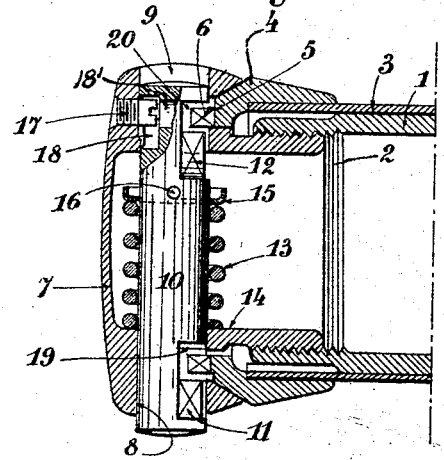
Fig. 1 is a view in axial section of the locking device in the unlocked position.
Figure 3:
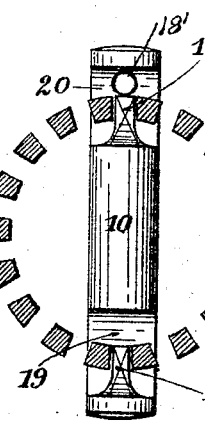
Fig. 3 is a partial cross section according to A—A, Fig. 2, seen from the interior, the central nut and the means for controlling the locking rod being not shown.

1 represents the permanent internal hub which is permanently secured to the axle, not shown, and is provided with an inner screw-thread 2.

3 indicates the removable external hub having at its outer part a male conical portion 4 ending in an annular part 5 at the end whereof are formed locking teeth 6.

The tightening nut 7 which contains the elements providing for the locking, is bored perpendicular to the axis of the wheel, so as to form two diametrically opposite holes 8 and 9 which are adapted to properly guide a locking rod 10.

Figure 2:
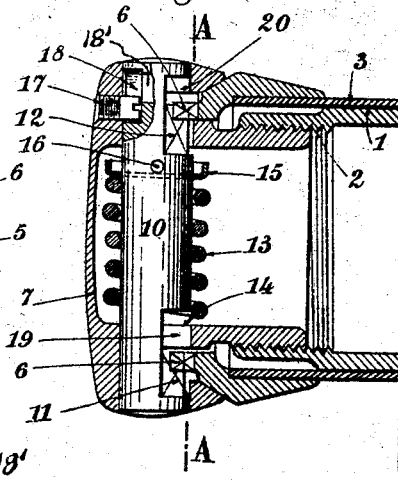
Fig. 2 is a similar view in the locked position.
Figure 4:
Fig. 4 is an elevation of the locking rod showing its laterally outer portion.

In the example represented, the rod 10 is cylindrical and has a tooth at each end. These teeth 11 and 12, in the locking position (Fig. 2), engage the toothed part 6 of the external hub, at two diametrically opposite points.

As shown, the teeth 11 and 12 are located respectively in recesses 19 and 20 provided in the rod 10, whereby the general cylindrical shape of the rod is not affected. The recesses 19 and 20 are so dimensioned that they provide a free passage for the teeth 6 when the rod 10 is in the unlocked position (Fig. 1).

The tooth 6 which is in contact with the tooth 11 of the rod 10 tends to rotate the latter in one direction about its axis, while the tooth 6 which is in contact with the tooth 12 tends to rotate the rod in the opposite direction; the rod has thus no tendency to rotate about its axis.

The rod is held in the locking position by a spring 13 bearing at one end at 14 upon the internal surface of the nut and at the other end acting upon a small cup 15 maintained on the bolt 10 by a pin 16 or by a screw or like element.

The unlocked position can be obtained by means of any suitable wrench, and especially by means of an ordinary wrench with stud.

The head of a stud 17 screwed into the nut 7 engages a mortise 18 in the rod 10 in order to guide said rod. An aperture 18' affords communication between the recess 20 and the mortise 18 and permits screwing the stud 17 in place in assembling the device.

Having now described my invention, what I claim as new and desire to secure by Letters Patent is:

1. A locking device for removable wheels comprising in combination an inner permanent hub, an outer removable hub, a central nut screwed into the inner hub and securing the outer hub on the inner hub, a rod adapted to slide in a direction at right angles to the axis of the hubs in diametrically opposite holes provided in the nut, a spring controlling said rod, a set of teeth provided on the outer hub and teeth on said rod adapted to engage with said set of teeth at two diametrically opposite points.

2. A locking device for removable wheels comprising in combination an inner permanent hub, an outer removable hub, a central nut screwed into the inner hub and securing the outer hub on the inner hub, a cylindrical rod adapted to slide in a direction at right angles to the axis of the hubs in diametrically opposite holes provided in the central nut, a spring controlling said rod, a set of teeth provided on the outer hub, recesses formed in said rod and teeth cut on the rod in said recesses in an axial plane of the rod, and adapted to engage with said set of teeth at two diametrically opposite points.

3. A locking device for removable wheels comprising in combination an inner permanent hub, an outer removable hub, a central nut screwed into the inner hub and securing the outer hub on the inner hub, a cylindrical rod adapted to slide in a direction at right angles to the axis of the hubs in diametrically opposite holes provided in the central nut, a spring controlling said rod, a set of teeth provided on the outer hub, recesses formed in said rod, teeth cut on the rod in said recesses in an axial plane of the rod and adapted to engage with said set of teeth at two diametrically opposite points, a longitudinal mortise in said rod and a guiding stud carried by the nut and adapted to engage into said mortise.

In testimony whereof I have signed my name to this specification.

LOUIS ROUANET.